United States Patent [19]

Catanese

[11] Patent Number: 5,066,913
[45] Date of Patent: Nov. 19, 1991

[54] FERROUS METAL DETECTOR FOR DETECTING A BROKEN MANDREL IN A COLD PILGERING OPERATION

[75] Inventor: John A. Catanese, Seward, Pa.

[73] Assignee: Westinghouse Electric Corp., Pittsburgh, Pa.

[21] Appl. No.: 517,887

[22] Filed: May 2, 1990

[51] Int. Cl.⁵ ................... G01N 27/72; G01R 33/12
[52] U.S. Cl. .................................. 324/226; 324/239; 324/262
[58] Field of Search .............. 324/239, 326–329, 324/226, 262; 72/31

[56] References Cited

U.S. PATENT DOCUMENTS

| | | | |
|---|---|---|---|
| 3,500,181 | 3/1970 | Jackson | 324/37 |
| 3,665,298 | 5/1972 | Gieger | 324/239 |
| 4,188,577 | 2/1980 | Mhatre et al. | 324/320 |
| 4,191,922 | 3/1980 | Harris et al. | 324/225 |
| 4,354,156 | 12/1982 | Kennedy | 324/228 |
| 4,611,170 | 9/1986 | Stanley et al. | 324/329 |
| 4,644,271 | 2/1987 | Toth et al. | 324/238 |
| 4,821,204 | 4/1989 | Huschelrath | 364/481 |

FOREIGN PATENT DOCUMENTS 0588485  5/1947  United Kingdom ............... 324/239

Primary Examiner—Walter E. Snow
Attorney, Agent, or Firm—Joseph C. Spadacene

[57] ABSTRACT

A ferrous metal detector is used in conjunction with a ferrous metal mandrel of a pilger tooling set in a cold-pilgering machine to sense when the mandrel breaks during operation of the machine. The ferrous metal detector includes a transformer located adjacent to an end of the mandrel. The transformer has a primary winding and a secondary winding positioned along the path of tubing movement through the machine and sufficiently close to one another to be magnetically coupled together by a piece of the ferrous mandrel when located therebetween. The primary winding is excited by a suitable source with a constant predetermined signal which is transparent to non-ferrous metal of the tubing. Such signal couples a constant voltage in the secondary winding. An indicator is connected to the secondary winding for detecting a change in the constant voltage in the secondary winding being the result of an increase in magnetic coupling between the primary and secondary windings as would be produced by advancement of a broken piece of the ferrous metal mandrel between the windings.

9 Claims, 3 Drawing Sheets

FERROUS METAL DETECTOR FOR DETECTING A BROKEN MANDREL IN A COLD PILGERING OPERATION

CROSS REFERENCE TO RELATED APPLICATION

Reference is hereby made to the following copending U. S. application dealing with related subject matter and assigned to the assignee of the present invention: "High Strength Cemented Carbide Dies And Mandrels For A Pilgering Machine" by Francis Cellier et al, assigned U.S. Ser. No. 063,038 and filed Aug. 17, 1987.

BACKGROUND OF THE INVENTION

1. Field of the Invention

The present invention relates generally to cold-pilgering of thin-walled metallic tubing and, more particularly, is concerned with a ferrous metal detector for detecting a broken mandrel in a cold-pilgering operation.

2. Description of the Prior Art Cold-pilgering is a conventional tube forming operation by which a tube is simultaneously advanced over a stationary mandrel and compressed using two opposing roller dies resulting in the reduction of the cross-sectional area and in elongation of the tube. Representative of prior art pilgering machines are the ones disclosed and illustrated in U.S. Pat. No. (3,416,346) to Arrington, U.S. Pat. Nos. (3,487,675 and 3,690,850), to Edstrom et al, U.S. Pat. No. (4,090,386) to Naylor et al, and U.S. Pat. No. (4,233,834) to Matinlassi.

Typically, the input tube is reduced and elongated to the final tube by passing through a succession of stations of the cold-pilgering machine with each station being composed of a stationary mandrel and roller die set. Reduction is effected in both the diameter and wall thickness of the tube by means of the tapered shape of the mandrel and the circumferential tapered shape of grooves in the dies which embrace the tube from above and below the mandrel and roll in a constant cycle back and forth along the tube. Between each cycle of die movement, the tube is advanced and rotated incrementally along the mandrel. The mandrel prevents the tube from collapsing under the force of the roller dies while at the same time dictates the inner diameter of the tube.

Although the mandrels and roller dies are fabricated from high strength steel, a limiting factor in the cold-pilgering operation is the need for frequent replacement of mandrels and roller dies. Mandrel replacement is required when the steel mandrels become overstressed and break from severe operating conditions and occasional bending moments imposed thereon by tube eccentricity or slight misalignment. Roller die replacement is frequently required due to occurrence of surface cracks, fretting and spalling in the die grooves of the steel dies as a result of severe operating conditions of the pilgering machine. The invention of the patent application cross-referenced above is directed to increasing the longevity of pilger tooling, i.e., mandrels and roller dies, to improve the productivity and efficiency of the pilgering machine by providing high strength cemented carbide pilger tooling.

The occasional breaking of a mandrel can cause defects in the tube being formed or, more importantly, cause damage to the roller dies as they compress against the sharp edge of a broken mandrel. Once damaged, the dies must be replaced and repaired, resulting in costly downtime. Thus, it is advantageous to be able to detect a broken mandrel immediately after the break occurs so as to avoid the resultant damage to the dies.

Heretofore, a tuned oscillator circuit has been used to detect a broken mandrel. The circuit is tuned by the operator to calibrate or zero out the effect of the presence of the tube being formed so that the presence of a broken mandrel can be detected. However, interference from the tubing material still causes inaccuracy in the readings. These inaccuracies increase with the wall thickness of the tubes.

Consequently, a need exists for a way to consistently and quickly detect, regardless of tube wall thickness, broken mandrels during the cold-pilgering operation.

SUMMARY OF THE INVENTION

The present invention relates to a ferrous metal detector designed to satisfy the aforementioned needs. The ferrous metal detector of the present invention utilizes a fixed AC excitation signal of a frequency, such as 60 Hz. At this frequency, the non-ferrous metal of the tube being formed is transparent and does not affect the detector. The detector will thus sense a voltage change, such as an increase, which only can be caused by a broken mandrel and not by the presence of the tube. The relatively complex circuitry of the prior art tuned circuit is not now needed, and more accurate detection is possible.

Accordingly, the present invention is directed to a ferrous metal detector for detecting the presence of a ferrous metal object hidden from view within a non-ferrous body. The detector comprises: (a) sensing means for locating adjacent to the non-ferrous body and including a primary winding and a secondary winding positioned about the body and sufficiently close to one another to be magnetically coupled together by the ferrous metal object hidden within the non-ferrous body when located between the windings; (b) means connected to the primary winding for exciting the primary winding with a substantially constant predetermined signal being transparent to the non-ferrous body so as to couple a substantially constant voltage in the secondary winding unaffected by the presence of the body; and (c) means connected to the secondary winding for detecting a change in the constant voltage in the secondary winding as produced by an increase in magnetic coupling between the primary and secondary windings due to the presence between the windings of the ferrous object hidden within the non-ferrous body.

Further, the ferrous metal detector of the present invention is preferably set forth in combination with a pilger tooling for cold reduction of the cross-sectional size of tubing composed of non-ferrous material. The tooling has an elongated stationary mandrel, being composed of ferrous metal, for supporting a length of tubing thereon in position for cold reduction. The tooling also has a pair of roller dies positioned along opposing sides of the mandrel and in oppositely-facing relation to one another for coacting with the mandrel in cold reduction of the cross-sectional size of the tubing. The sensing means of the ferrous metal detector is located adjacent to the roller dies and an end of the mandrel. The primary and secondary windings of the sensing means are positioned along the path of tubing movement and sufficiently close to one another to be magnetically coupled together by a broken piece of the ferrous metal mandrel when located therebetween.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which.

DETAILED DESCRIPTION OF THE INVENTION

Figure 1:
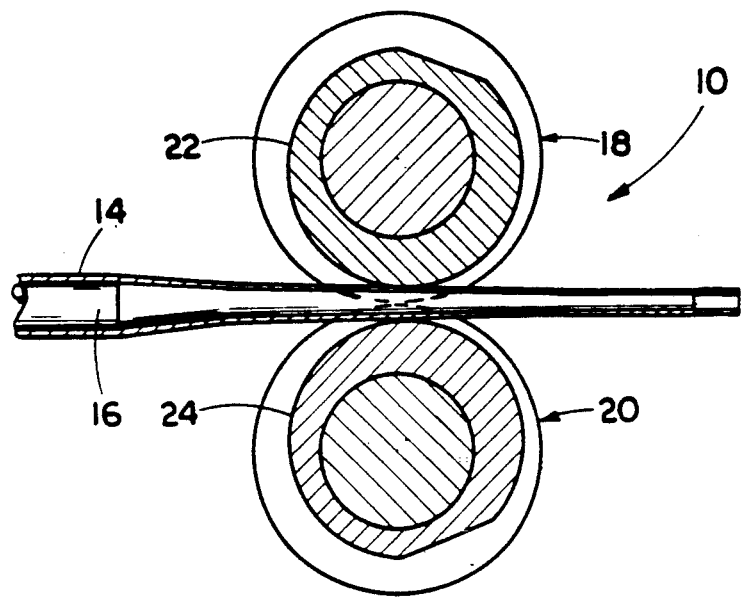
FIG. 1 is a side elevational, schematical view of a set of pilger tooling in the form of a mandrel and roller dies shown in operative position with respect to a tube being reduced in cross-sectional size and elongated therebetween, the roller dies being shown cross sectioned along a plane extending perpendicular to their rotational axes.
Figure 2:
FIG. 2 is an enlarged side elevational view of the mandrel of FIG. 1 by itself.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 8:
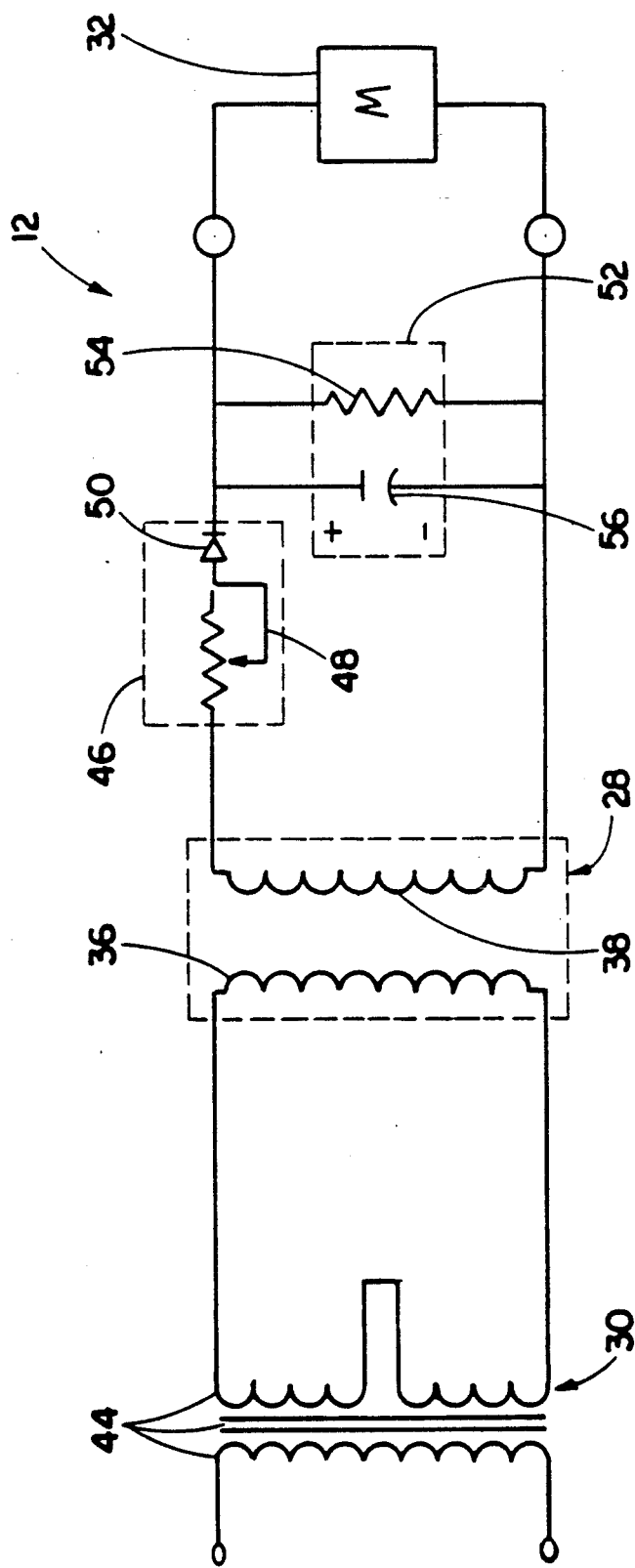
FIG. 8 is a schematic circuit diagram of the ferrous metal detector of the present invention employed in conjunction with a mandrel of one set of pilger tooling.

Referring now to the drawings, and particularly to FIG. 1, there is shown schematically a set of pilger tooling, generally designated 10, with which a ferrous metal detector 12 of FIG. 8 is advantageously employed. The tooling 10, useful in a cold-pilgering machine for cold reduction of a thin-walled tube 14, includes an elongated stationarily-positioned mandrel 16 and a pair of upper and lower roller dies 18, 20. The mandrel 16 supports the tube 14 thereon in position for cold reduction. The dies 18, 20 are positioned along opposing sides of the mandrel 16 and in oppositely-facing relation to one another for coacting with the mandrel to reduce the cross-sectional size of the tube 14 in a known manner.

As mentioned earlier, the cold-pilgering operation in which the mandrel 16 and dies 18, 20 are employed is a conventional cold reducing process. The tube 14 is advanced over the mandrel 16 as the latter is maintained stationary and simultaneously the tube 14 is compressed using the two opposing roller dies 18, 20. Compression of the tube 14 results in the reduction of the cross-sectional area and in elongation of the tube 14.

Figure 3:
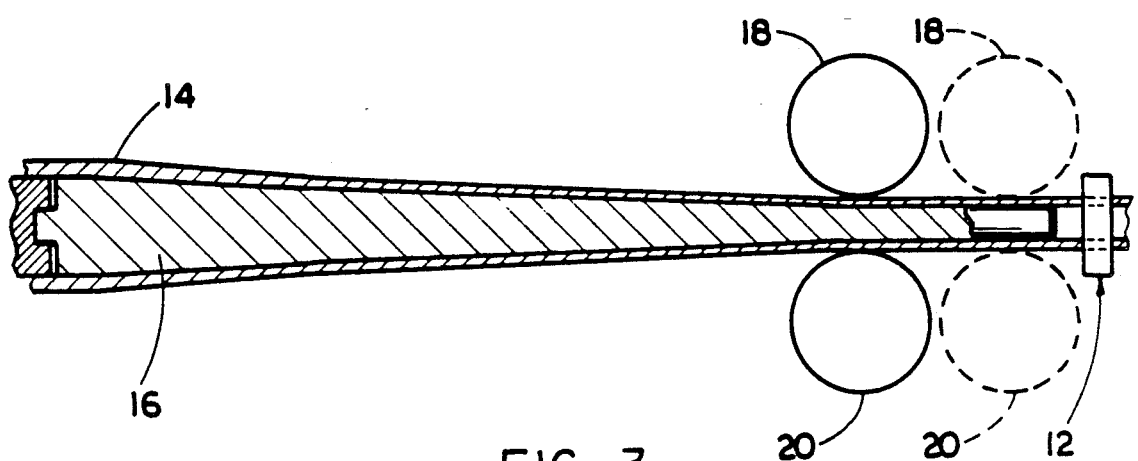
FIG. 3 is another side elevational, schematical view of the set of pilger tooling of FIG. 1 together with a sensing transformer of a ferrous metal detector of the present invention.
Figure 4:
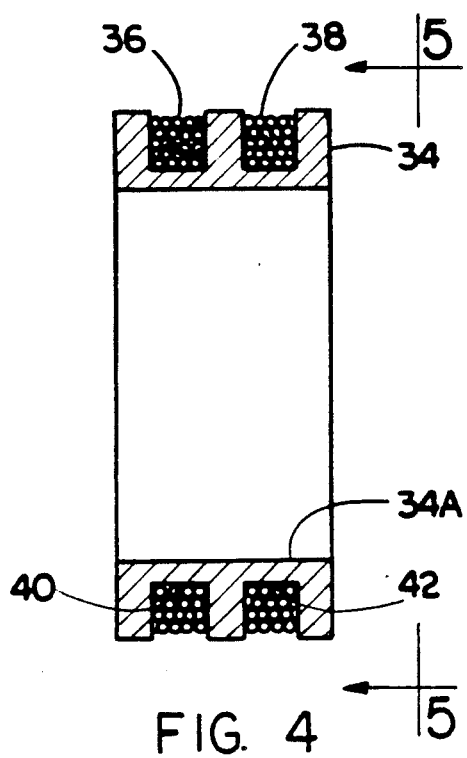
FIG. 4 is an enlarged side elevational view of the sensing transformer of FIG. 3.
Figure 5:
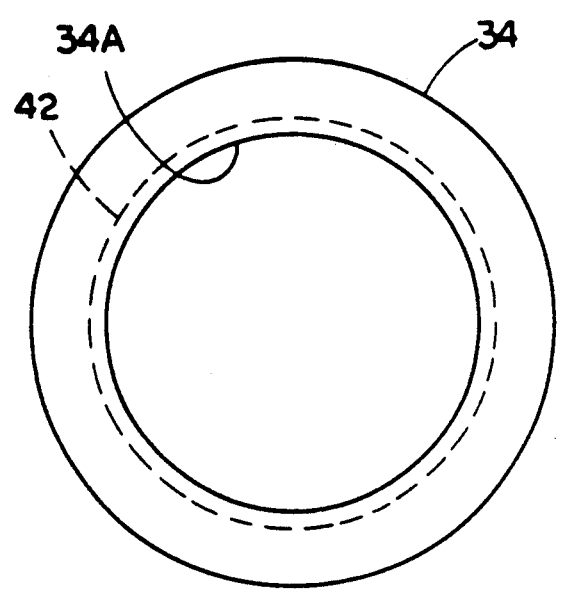
FIG. 5 is an end elevational view of the sensing transformer as seen along line 5—5 of FIG. 4.

Typically, the input tube 14 is reduced and elongated to the final tube by passing through a succession of stations of the cold-pilgering machine. Each station is composed of a set of tooling 10. Reduction is effected in both the diameter and wall thickness of the tube 14 by means of the cylindrical tapered shape of the mandrel 16 and the circumferential tapered shape of grooves 22, 24 in the dies 18, 20 which embrace the tube 14 from above and below the mandrel 16 and roll in a constant cycle back and forth along the tube, as depicted in FIG. 3. Between each cycle of die movement, the tube 14 is advanced and rotated incrementally along the mandrel 16 by suitable conventional mechanism not shown. The mandrel 16 prevents the tube 14 from collapsing under the force of the roller dies 18, 20 while at the same time dictates the inner diameter of the tube.

Ferrous Metal Detector of the Invention

As mentioned earlier, occasionally the mandrel 16 breaks, permitting a broken off piece of the mandrel 16 to advance with the tube 14 and expose the roller dies 18, 20 to damage due to compression of the tube against sharp edges of the broken mandrel 16. In order to mitigate the potential damage caused by the broken mandrel 16, it is important to be able to detect its condition as quickly as possible after the break occurs.

Turning to FIGS. 3-5 and 8, there is illustrated a ferrous metal detector, generally designated 12, which allows early detection of a broken off piece of the mandrel 16 in applications where the mandrel 16 is composed of ferrous metal and the tube 14 is composed of non-ferrous metal, such as zirconium. The detector 12 employs a sensing transformer 28 that is excited by a signal of a frequency transparent to non-ferrous metal composing the tube 14, but sensitive to ferrous metal composing the mandrel 16.

In its basic components, the ferrous metal detector 12 includes the sensing transformer 28, a source 30 of electrical excitation for the transformer 28, and an indicator 32 for detecting a change in voltage level of the transformer 28. More particularly, the transformer 28 is located adjacent to an end 16A of the mandrel 16 and to the pair of upper and lower roller dies 18, 20. The transformer 28 includes an annular member 34 defining an air core and having a central opening 34A permitting passage of the tube 14, and a primary coil winding 36 and a secondary coil winding 38 positioned in axially spaced side-by-side relation to one another and wrapped about the annular member 34. The windings 36, 38 are respectively located within a pair of axially spaced side-by-side annular recesses 40, 42 formed circumferentially within and about the periphery of the annular member 34. The annular member 34 is preferably composed of a suitable plastic material, As seen in FIG. 3, the primary and secondary windings 36, 38 of the transformer 28 are positioned about the tube 14 and along the path of tubing movement through the pilger tooling 10. The primary and secondary windings 36, 38 are positioned sufficiently close to one another to be magnetically coupled 35 together when a broken-off piece of the ferrous metal mandrel 16 advances with the tube 14 between the windings.

The primary winding 36 of the sensing transformer 28 is excited by an excitation source 30 with a substantially constant predetermined signal which is substantially transparent to the non-ferrous metal of the tube 14. For example, the excitation source 30 can be a step-down transformer 44 interposed between the utility line signal and the primary winding 36 of the sensing transformer 28. The step-down transformer 44 will reduce an approximate 120-volt, 60 Hz AC line signal to an approximate 12-volt, 60 Hz signal. Such signal couples a substantially constant voltage into the secondary winding 38 of the sensing transformer 28 which is unaffected by the presence of the nonferrous metal tube 14. Optionally, a rectifier 46 composed of a variable resistor 48 and a diode 50, and a filter 52 composed of resistor 54 and capacitor 56 connected in parallel can be interposed between the secondary winding 38 of the sensing transformer 28 and the indicator 32 to convert the AC signal to a DC voltage signal.

The meter M or indicator 32 of the ferrous metal detector 12 is coupled to the secondary winding 38 of the sensing transformer 28 for detecting a change in the constant voltage in the secondary winding. Such change would result from an increase in magnetic coupling between the primary and secondary windings 36, 38. An increase of the magnetic coupling would be produced by advancement of a broken piece of the ferrous metal mandrel 16 between the windings 36, 38. The detector indicator 32 can be any suitable conventional component. One example is an ordinary voltage meter. Another example is a conventional comparator-type amplifier and alarm circuit, such as available from Banner Engineering Corporation and identified by the commercial named BANNER B3 AMPLIFIER. With such circuit, when the increase in the DC voltage signal exceeds a preset limit, it would be detected by the comparator-type amplifier and, in turn, activate the alarm which can be interfaced with other electrical devices. One such device is an automatic switch for shutting down the pilgering machine upon activation of the alarm.

Figure 6:
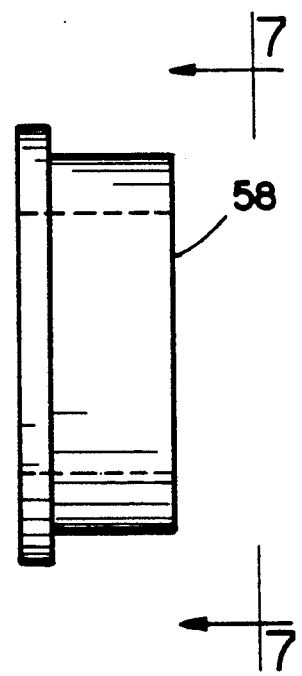
FIG. 6 is a side elevational view of an insert which can be employed with the sensing transformer of FIG. 4 in conjunction with cold-pilgering of tube having substantially smaller diameter sizes than inside diameter of the sensing transformer.
Figure 7:
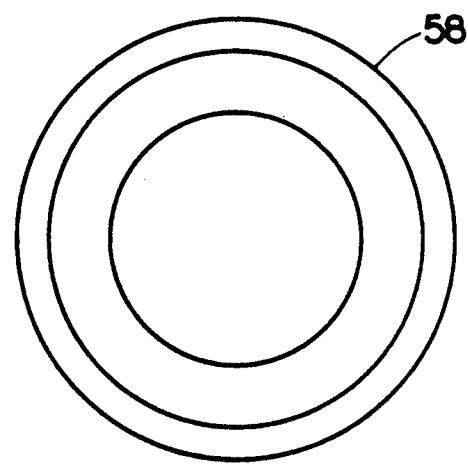
FIG. 7 is an end elevational view of the insert as seen along line 7—7 of FIG. 6.

FIGS. 6 and 7 illustrate an annular insert 58 which can be interfitted with the annular member 34 of the sensing transformer 28 to adapt it for use with production of smaller diameter tubes 14.

The 60 Hz frequency signal from the line source is ideal for this application since non-ferrous metals are transparent to the detector 12 at this frequency but ferrous metal of the mandrel and other ferrous metal materials are not. The ferrous metal detector 12 of the present invention is effective for all tubing wall sizes and, because the tubing is transparent to the detector, the detector 12 is very effective for thick wall tubing. As the tubing wall becomes thicker, the prior art tuned detector becomes ineffective because the tubing effect must be cancelled by constantly tuning the detector so that the detector can sense the broken mandrel. However, this reduces the sensitivity of the prior art detector. The ferrous metal detector 12 of the present invention entirely eliminates such problems.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the forms hereinbefore described being merely preferred or exemplary embodiments thereof.

I claim:

1. In combination wit pilger tooling of cold reduction of the cross-sectional size of tubing composed of non-ferrous metal, said tooling including an elongated stationary mandrel composed of ferrous metal for supporting a length of tubing thereon in position for cold reduction and a pair of roller dies positioned along opposing sides of said mandrel and in oppositely-facing relation for coacting with said mandrel in cold reduction of the cross-sectional size of the tubing as the tubing is moved along a predetermined path relative to said mandrel and between said dies, a ferrous metal detector, comprising:
    (a) sensing means located adjacent to said roller dies and an end of said mandrel and including a primary winding and a secondary winding positioned along the path of tubing movement and sufficiently close to one another to be magnetically coupled together by a piece of said ferrous mandrel when located therebetween; and
    (b) means connected to said primary winding for exciting said primary winding with a substantially constant predetermined signal being transparent to the non-ferrous metal of the tubing so as to couple a substantially constant voltage in said secondary winding unaffected by the presence of the tubing; and
    (c) means connected to said secondary winding for detecting a change in the constant voltage in said secondary winding as would be produced by an increase in magnetic coupling between said primary and secondary windings due to the presence between said windings of a piece of the mandrel composed of ferrous material.

2. The detector as recited in claim 1, wherein said sensing means includes an annular member defining an air core, said primary and secondary windings being positioned in axially spaced side-by-side relation to one another and wrapped about said annular member.

3. The detector as recited in claim 2, wherein said annular member has a pair of axially spaced side-by-side annular recesses formed about the periphery of said member, said primary and secondary windings are respectively located in said recesses.

4. The detector as recited in claim 1, wherein said excitation source is a step-down transformer interposed between a utility AC line signal and said primary winding of said sensing means.

5. The detector as recited in claim 1, further comprising:
    a rectifier interposed between said secondary winding and said detecting means for converting AC voltage to DC voltage.

6. The detector as recited in claim 5, further comprising:
    a filter interposed between said rectifier and said detecting means.

7. The detector s recited in claim 1, wherein said detecting means is an indicator in the form of a voltage-reading meter.

8. The detector as recited in claim 1, wherein said detecting means is an indicator in the form of a comparator-type amplifier and alarm circuit.

9. The detector as recited in claim 2, further comprising:
    an annular insert interfittable with said annular member to adapt it for use with production of tubes of different diameter sizes.

* * * * *